Patented Dec. 19, 1944

2,365,413

UNITED STATES PATENT OFFICE 2,365,413

PROCESS FOR DEHYDROGENATION OF GASEOUS AND LIQUID HYDROCARBONS

Herman B. Kipper, Accord, Mass.

No Drawing. Application August 3, 1942,
Serial No. 453,483

4 Claims. (Cl. 260—683.3)

In patent application Serial No. 576,937 of November 23, 1931, applicant describes a method for the synthesis of isoprene from methane and acetylene. The yield of isoprene was not very high and its polymerization to a synthetic rubber proved far less satisfactory than applicant had been led to believe from the literature, so that he abandoned the application.

During experimentation applicant found that acetylene, generally held to be dangerously explosive at higher temperatures and pressures, could safely be used for reaction for as high temperatures as 400 to 500 degrees centigrade and 400 to 500 pounds pressure, if suitably diluted with an inert gas, as nitrogen. Fifty to seventy percent of diluent gas to fifty to thirty percent of acetylene was used at the temperatures and pressures noted.

In patent application Serial No. 187,897 of January 31, 1938, applicant again describes the use of nitrogen as diluent gas for establishment of added or enhanced pressure and polymerization of olefinic gases with the use of metal chloride catalysts, as well as catalysts made from "solid" phosphoric acid and metal hydrogen phosphates. These polymerizations were conducted for the synthesis of drying oils. Subsequently, applicant carried out further work along the same line and was able to increase the speed of polymerization four to five-fold when polymerizing the commercial butylene gas with "solid" hydrogen copper phosphate at about 225 degrees centigrade by increasing the pressure from 250 to 1000 pounds, the additional 750 pounds pressure being established by nitrogen gas. Low boiling oils (about 110 to 200 degrees centigrade) were thereby synthesized, whereas when the undiluted butylene gases were polymerized at the higher pressures, or say 1000 pounds, oils distilling at higher temperatures were synthesized or those more of the nature described in the last mentioned application and used with drying oils.

The last valuable finding applicant made in the use of a diluent gas for aid in organic synthesis was in the dehydrogenation of butylene to butadiene and in the dehydrogenation of petroleum oils to give unsaturated hydrocarbon oils.

In my Patent No. 2,274,204 of February 24, 1942, I described the dehydrogenation of butane by oxy-dehydrogenation, or with the use of air, or air diluted by an inert gas, as nitrogen. No carbon dioxide, that is no combustion, was found in the dehydrogenation tests but the oxygen was nevertheless practically completely utilized.

In December 1941, or after our entrance into the Asiatic-European war, applicant tried out the possibility for dehydrogenation of butane to butadiene. Sufficient oxygen was mixed with the butane to give butylene by dehydrogenation, as by the aforementioned patent description, the gas produced was then collected in a reservoir, re-run through the reaction tube at about two hundred degrees centigrade, this time with sufficient oxygen to give butadiene, re-collected in a cylinder or reservoir and finally this gas thus collected was run over an aluminum oxide or zinc oxide (90 to 95 percent) ferric oxide (10 to 5 percent) catalyst at about four hundred degrees centigrade. Chromic oxide was also used in place of ferric oxide and, of course, other catalytic combinations might be employed. A temperature range of from 350 to 450 degrees was employed. Butadiene was formed and determined as tetrabromide. The catalysts were prepared by heating coarse aluminum oxide with zinc oxide particles with a solution of ferric or chromic nitrates until decomposition of the nitrates had been fully established, as at a red heat. Also aluminum and zinc colloidal hydrates were mixed with the ferric or chromic nitrates in solution and heated to decomposition of the nitrates. About two hundred grams of catalyst was spread on one hundred and fifty grams of asbestos particles used as carriers. A chrome-nickel-iron alloy tube 66 inches long, one and one-half inches internal diameter and two and three-eighths inches external diameter was employed as the reaction tube. The tube was heated by electric resistance furnaces. The basic operational methods were those employed in the above-mentioned Patent 2,274,204.

The process noted will now be tried out with more adequate apparatus. That is, three reaction tubes should be utilized simultaneously in series for the gas flow and with requisite gas flow control. Such facilities applicant did not have at hand, and it is difficult to secure the same at present. Applicant wrote to several large oil companies about the matter last year, but they seemed to take the attitude that the butadiene problem was already solved. If the comments of the press amount to anything, that condition has not yet been attained. The establishment of 99 percent dehydrogenation processes in itself achieves a foundation that merits further trial.

Applicant has basically described his processing in Patent No. 2,274,204 and only the final step is novel to this application. In other words, only the final step of subjecting the gas and oxygenated gaseous products to heating over the catalysts noted at atmospheric to seventy pounds pressure at approximately 400 degrees to give butadiene as the final product is novel. Subatmospheric or higher pressures than those noted naturally might be used. Flow of gas from one-half to ten liters per minute of butane was used.

In the above noted patent description ferric and cupric hydroxides were used as catalysts. It was further noted that cuprous and ferrous oxides and hyroxides were being experimented with. It was subsequently found that under the conditions of operation, these ferrous and cuprous salts were reduced to give the respective methods, as iron and copper. It was further determined that the mixture of the finely divided metal, as copper, with the oxide and hydroxide, as ferric hydroxide, represented an excellent catalytic combination for oxy-dehydrogenation of the gases used.

The use of a diluent gas in conjunction with organic syntheses was practiced by applicant over ten years ago, as in application Serial No. 561,158 of September 4, 1931. Applicant used nitrogen as the diluent gas when reacting methane with acetylene to give isoprene even at five hundred pounds pressure and five hundred degrees centigrade, application No. 576,937 of November 23, 1931. The difficulty of satisfactory polymerization of isoprene to rubber made him abandon the process. Applicant had been misled by the general literature pertaining to this polymerization step. At about the same time, applicant practiced dehydrogenation of petroleum gas or fuel oils at 600 to 700 degrees (application No. 561,158) with the aid of metallic chromate catalysts and with the use of a diluent gas. He found the process fully satisfactory as regards dehydrogenation, but butadiene or isoprene were not found in sufficient quantity to render the process as judged by applicant of commercial value. Only dehydrogenation of the petroleum oil was established as conclusive. Carbon dioxide and methane were also used as diluent gases in his earlier application. Pressures of from subatmospheric to a thousand pounds were employed and temperatures of from 500 to 800 degrees.

In his present operations, generally about twenty cubic centimeters per minute of an 0.89 specific gravity petroleum oil were pumped through the reaction tube at about 600 to 650 degrees and about one and one-half liters of nitrogen gas per minute were passed simultaneously through the reaction tube at about fifteen pounds pressure. Other pressures and flows of oil were actually utilized and of course these features might be further greatly varied. The oil produced showed about a 3 percent unsaturation and its specific gravity was found as practically unaltered by the dehydrogenation operation, when conducted at about fifteen pounds superatmospheric pressure, although a very considerable amount of inflammable gas is given off during the reaction. No attempt was made to analyze this gas during the present operation. The reaction tube was cleaned after about 24 hours of operation by blowing air through it when heated to redness or about 700 degrees. Just how often this cleansing operation would have to be conducted commercial operations should be the determining factor.

Applicant used metal chromates for this dehydrogen work as described in his earlier applications noted. In this latter experimentation, he found that a mixture of copper, iron and lead chromates in equal weights represented an excellent catalytic combination. Again such combination was used with aluminum and zinc oxides in about a 50 percent mixture. As noted, the single metallic chromates were employed and those also mixed with zinc and aluminum oxides. Of course, a limitless number of such combinations might be established. The catalysts employed for his work on dehydrogenation at 400 degrees, as the chromic and aluminum oxide catalysts described, were also used in these tests and with pretty satisfactory results.

The dehydrogenated or unsaturated hydrocarbon oil produced as above was condensed with colophony resin according to applicant's Patent No. 2,224,608 of December 10, 1940, or with a phenolic-formaldehyde oil soluble resin to give a synthetic drying oil. The quality of these drying oils applicant determined some years ago is bettered by addition or admixture of many different substances, as natural and synthetic resins condensed with vegetable oil, as the ester of colophony resin condensed with linseed or tung oil, and colophony resin condensed with soya bean oil. The latter condensation product is very viscous and serves admirably to raise the viscosity of the synthetic drying oil. About 5 to 10 percent was employed for this purpose. Other admixtures or additions used were chlorinated rubber, previously dissolved in a vegetable drying oil, or established by grinding together with the synthetic drying oil in a pebble mill; again, glyceric esters of resins and of phthalic acid and combinations of such esters; ethyl cellulose ground with the drying oil, etc. Applicant has also incorporated with the synthetic drying oils viscous or semi-plastic materials as melamine (1 to 2 percent) condensed with aldehydes, as aldol, furfural, croton aldehyde, etc. The aldol condensation product is the most valuable for enhancing the weathering quality of the oil, but unfortunately the odor of aldol is imparted to the drying oil by its incorporation with the latter. Incorporation of these compounds, more especially the vegetable oil resin esters, with unsaturated petroleum hydrocarbon oils alone, give good synthetic drying oils. Five to twenty percent of these vegetable oil resin esters were used by applicant in his drying oils, whereas possibly one to two percent each of chlorinated rubber, ethyl cellulose, glycerol phthalate, etc. were so used. Finally, applicant has determined that heating of these synthetic drying oils, with the vegetable oil resin esters, glyceric esters, etc. dissolved therein, for instance to 120 to 250 degrees, betters the quality of the oil. It is possible that molecular rearrangements occur.

Applicant has used those metals which form lower and higher oxides as antimony, chromium, vanadium, etc., in these oxy-dehydrogenation syntheses and found the oxides of this class of metals equivalent to copper and iron, also inclusive in the said class, for such syntheses. He has not yet had the time to carry out oxy-dehydrogenation with the use of this class of oxides but believes that because of the number of patents granted him on oxy-dehydrogenation of petroleum oils with this group of metallic oxide catalytic materials that he is entitled to their employment in place of copper and iron.

I claim:

1. In a process for the pyrolytic dehydrogenation of liquid petroleum hydrocarbons, the step of conducting the said dehydrogenation in an atmosphere of nitrogen and with the use of a mixture of copper, iron and lead chromates as catalysts suitably supported as by asbestos fibre and at temperatures of from 350 to 800 degrees and at pressures from subatmospheric to 1000 pounds.

2. In a process for the pyrolytic dehydrogenation of liquid petroleum hydrocarbons, the step of conducting the said dehydrogenation in the use of metallic chromates in conjunction with aluminum and zinc oxides, as catalysts, all suitably supported, at temperatures of from 350 to 800 degrees and at pressures from subatmospheric to 1000 pounds.

3. In a process for the pyrolytic dehydrogenation of liquid petroleum hydrocarbons, the step of conducting the said dehydrogenations with the use of a mixture of copper, iron and lead chromates and aluminum oxide as catalysts at temperatures of 350 to 800 degrees and at pressures from subatmospheric to 1000 pounds.

4. In a process for the pyrolytic dehydrogenation of a petroleum oil of about 0.9 specific gravity the step of conducting the said dehydrogenation with the use of a mixture of copper, iron and lead chromates and aluminum oxides suitably supported on asbestos fibre at temperatures of 600 to 700 degrees and under a pressure of about 15 pounds.

HERMAN B. KIPPER.